US012574778B2

(12) United States Patent
Knaappila et al.

(10) Patent No.: US 12,574,778 B2
(45) Date of Patent: Mar. 10, 2026

(54) SYSTEM AND METHOD FOR SYNCHRONOUS WIRELESS SENSOR MEASUREMENTS USING BLUETOOTH

(71) Applicant: Silicon Laboratories Inc., Austin, TX (US)

(72) Inventors: Jani Knaappila, Evitskog (FI); Jayanth Krishna, Leander, TX (US)

(73) Assignee: Silicon Laboratories Inc., Austin, TX (US)

( * ) Notice: Subject to any disclaimer, the term of this patent is extended or adjusted under 35 U.S.C. 154(b) by 476 days.

(21) Appl. No.: 18/115,108

(22) Filed: Feb. 28, 2023

(65) Prior Publication Data

US 2024/0292250 A1 Aug. 29, 2024

(51) Int. Cl.
*H04W 24/10* (2009.01)
*H04W 4/80* (2018.01)

(52) U.S. Cl.
CPC .............. *H04W 24/10* (2013.01); *H04W 4/80* (2018.02)

(58) Field of Classification Search
CPC ................................. H04W 24/10; H04W 4/80
See application file for complete search history.

(56) References Cited

U.S. PATENT DOCUMENTS

| | | | | |
|---|---|---|---|---|
| 2020/0217947 A1* | 7/2020 | Stitt | ................... | G07C 9/00309 |
| 2022/0322253 A1* | 10/2022 | Tsunashima | ........ | H04W 56/001 |
| 2024/0251363 A1* | 7/2024 | Liu | ........................ | H04W 48/10 |

FOREIGN PATENT DOCUMENTS

| | | | | | |
|---|---|---|---|---|---|
| CN | 117479096 A | * | 1/2024 | ............ | H04W 4/023 |
| WO | WO-2024065072 A1 | * | 4/2024 | ............ | B60R 25/00 |

* cited by examiner

*Primary Examiner* — Austin J Moreau
(74) *Attorney, Agent, or Firm* — Nields, Lemack & Frame, LLC

(57) ABSTRACT

A system and method of performing synchronized measurements using wireless sensor devices is disclosed. A central device transmits a periodic advertisement that includes a special command instructing the wireless sensor devices to perform a measurement. Further, the periodic advertisement also includes measurement timing which defines the time that the measurement is to be performed. Additionally, the periodic advertisement may include measurement parameters, which provide information about the measurement to be performed. A periodic advertisement with response is then used to allow all of the wireless sensor devices to transmit their respective measurement data back to the central device. This may be used to perform one synchronized measurement or a plurality of measurements.

17 Claims, 5 Drawing Sheets

SYSTEM AND METHOD FOR SYNCHRONOUS WIRELESS SENSOR MEASUREMENTS USING BLUETOOTH

FIELD

This disclosure describes a system and method to synchronize wireless sensor measurements using a Bluetooth network.

BACKGROUND

The Bluetooth protocol is one of many wireless network protocols that are currently in use. The Bluetooth protocol is commonly used to connect smartphones to watches, headphones, speakers, and other accessories. Bluetooth Low Energy utilizes 40 physical channels in the 2.4 GHZ ISM band, each channel separated by 2 MHZ.

The Bluetooth protocol may be used with sensor devices to measure some parameter, which may be temperature, humidity, light, movement, radio waves or others. In some embodiments, there may be multiple sensors that are arranged in a predetermined configuration to measure the parameter. In certain scenarios, it may be beneficial for all of the sensors to take the measurement at the same time.

Consider a situation where an automobile has a plurality of sensors that are used to detect the spatial location of the key fob. For example, it may be important to determine when the key fob is in the automobile, near a door of the automobile or a distance away. This may be achieved by measuring the power of the radio waves that are received from each sensor. If the power levels received by the sensors on the driver's side of the automobile are greater than those on the passenger's side, the system may determine that the key fob is outside the automobile on the driver's side of the vehicle. However, since the key fob is a movable component, it is beneficial to have all of the sensors perform a measurement at the same time, so as to accurately determine the spatial location of the key fob at a certain point in time.

However, it is difficult to synchronize a plurality of wireless sensors such that all sensors take measurements at the same time. Therefore, it would be beneficial if there was a system and method that allowed synchronized measurements to be taken by a plurality of wireless sensor devices in a Bluetooth network.

SUMMARY

A system and method of performing synchronized measurements using wireless sensor devices is disclosed. A central device transmits a periodic advertisement that includes a special command instructing the wireless sensor devices to perform a measurement. Further, the periodic advertisement also includes measurement timing which defines the time that the measurement is to be performed. Additionally, the periodic advertisement may include measurement parameters, which provide information about the measurement to be performed. A periodic advertisement with response is then used to allow all of the wireless sensor devices to transmit their respective measurement data back to the central device. This may be used to perform one synchronized measurement or a plurality of measurements.

According to one embodiment, a method of performing a synchronized measurement using a plurality of wireless sensor devices is disclosed. The method comprises wirelessly transmitting, from a central device, a periodic advertisement, wherein the periodic advertisement requests a measurement and contains synchronized measurement information; receiving, at the plurality of wireless sensor devices, the periodic advertisement; scheduling, at each of the plurality of wireless sensor devices, the measurement at a time specified by the synchronized measurement information; performing, at each of the plurality of wireless sensor devices, the measurement to obtain measurement data; and transmitting the measurement data from the plurality of wireless sensor devices to the central device in response to a subsequent periodic advertisement transmitted from the central device. In some embodiments, the synchronized measurement information comprises the time that the measurement is to be performed. In some embodiments, the synchronized measurement information comprises type of measurement to be performed. In some embodiments, the measurement comprises a determination of a strength of a signal transmitted on a channel, and the synchronized measurement information contains the channel to be monitored. In certain embodiments, the signal is transmitted by a device having an access address, and the synchronized measurement information contains the access address of the device. In certain embodiments, the synchronized measurement information contains a modulation scheme used by the device having the access address. In some embodiments, the periodic advertisement is used to instruct the plurality of wireless sensor devices to perform the measurement, transmit previously obtained measurement data, or both. In some embodiments, the subsequent periodic advertisement comprises a periodic advertisement with response (PAwR). In some embodiments, the time specified by the synchronized measurement information is before a next periodic advertisement is transmitted.

According to another embodiment, a wireless sensor device is disclosed. The wireless sensor device comprises a Bluetooth network interface; a sensor; a processing unit; and a memory device comprising instructions, which when executed by the processing unit, enable the wireless sensor device to: receive a periodic device, wherein the periodic advertisement from a central advertisement requests a measurement and contains synchronized measurement information; schedule a measurement at a time specified in the synchronized measurement information; and perform the measurement at the time using the sensor to obtain measurement data. In some embodiments, the time is referenced to an anchor point of an advertisement interval. In some embodiments, the memory device further comprises instructions, which when executed by the processing unit, enable the wireless sensor device to: receive a second periodic advertisement from the central device, wherein the second periodic advertisement requests the measurement data; and transmit the measurement data to the central device. In some embodiments, the time is prior to receipt of the second periodic advertisement. In some embodiments, the second periodic advertisement requests a second measurement and contains synchronized measurement information; and the wireless sensor device performs the second measurement and transmits measurement data from the measurement before a third periodic advertisement is transmitted from the central device. In some embodiments, the sensor measures a strength of an incoming signal.

According to another embodiment, a wireless sensor system utilizing a Bluetooth protocol is disclosed. The system comprises a central device; and a plurality of wireless sensor devices; wherein the central device transmits a periodic advertisement, wherein the periodic advertisement requests the plurality of wireless sensor devices to perform a measurement and contains synchronized measurement information; and the plurality of wireless sensor devices each schedule and perform the measurement at a time specified by the synchronized measurement information to obtain measurement data, such that all of the plurality of wireless sensor devices perform the measurement at the specified time. In some embodiments, the central device transmits a second periodic advertisement, wherein the second periodic advertisement is used to instruct the plurality of wireless sensor devices to perform a second measurement, transmit the measurement data, or both. In some embodiments, the central device transmits a second periodic advertisement, wherein the second periodic advertisement is a periodic advertisement with response (PAwR); and in response to the second periodic advertisement, the plurality of wireless sensor devices each transmit measurement data to the central device. In certain embodiments, the time specified is before a transmission of the second periodic advertisement. In some embodiments, the wireless sensor system is used to determine a spatial location of a key fob.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1A:
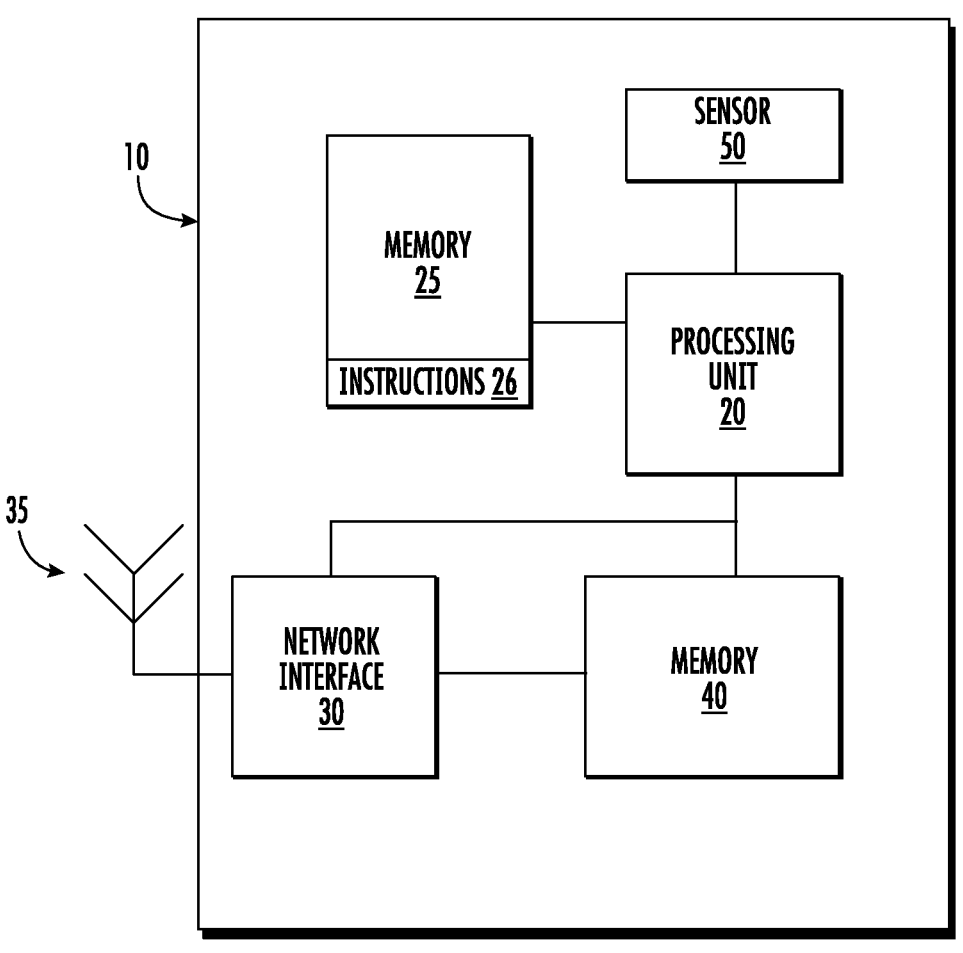
FIG. 1A shows a block diagram of a Bluetooth device according to one embodiment.

FIG. 1A shows a block diagram of a representative Bluetooth device 10 that may be used to implement the disclosed method of synchronized measurements in a Bluetooth network.

The Bluetooth device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions 26, which, when executed by the processing unit 20, enable the Bluetooth device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1A. The second computer readable non-transitory media may be a CDROM, or a different memory device, which is located remote from the Bluetooth device 10. The instructions contained on this second computer readable non-transitory media may be downloaded onto the memory device 25 to allow execution of the instructions by the Bluetooth device 10.

The Bluetooth device 10 also includes a Bluetooth network interface 30 that connects with a Bluetooth network 100 using an antenna 35.

The Bluetooth device 10 may include a second memory device 40 in which data that is received and transmitted by the Bluetooth network interface 30 is stored. This second memory device 40 is traditionally a volatile memory. The processing unit 20 has the ability to read and write the second memory device 40 so as to communicate with the other devices in the Bluetooth network 100.

Although not shown, the Bluetooth device 10 also has a power supply, which may be a battery or a connection to a permanent power source, such as a wall outlet.

The Bluetooth device 10 may also include a sensor 50. The sensor may be a separate component, as shown in FIG. 1A, or may be integrated into other components. The sensor 50 may be used to measure incoming signal strength, RSSI (Received Signal Strength Indicator), temperature, movement, light intensity, humidity, or another parameter.

While the processing unit 20, the memory device 25, the Bluetooth network interface 30, the sensor 50 and the second memory device 40 are shown in FIG. 1A as separate components, it is understood that some or all of these components may be integrated into a single electronic component. Rather, FIG. 1A is used to illustrate the functionality of the Bluetooth device 10, not its physical configuration.

Figure 1B:
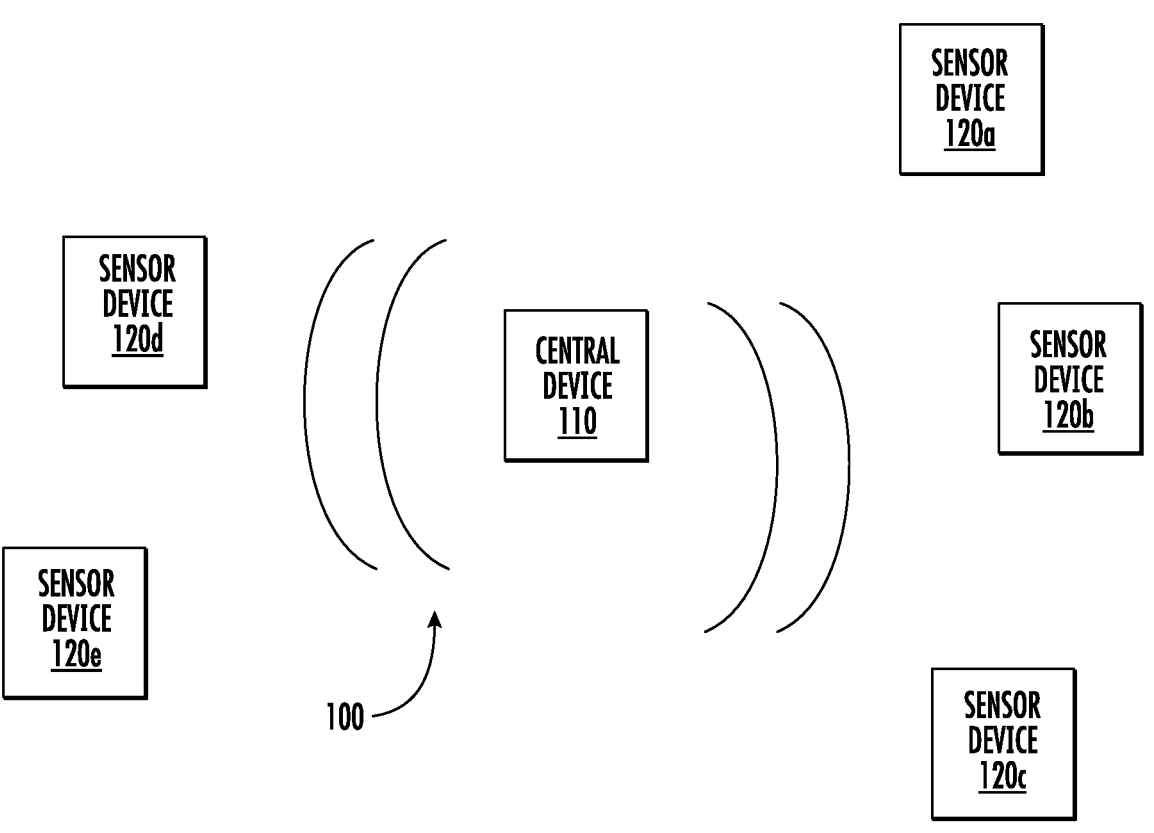
FIG. 1B shows a Bluetooth network including a central device and multiple wireless sensor devices.

FIG. 1B shows a Bluetooth network 100 that includes a plurality of wireless sensor devices 120a-120e, all of which may have an architecture similar to that shown in FIG. 1A. This may be referred to as a wireless sensor system. The central device 110 may also have a similar architecture. However, the processing power, memory capability and power requirements of the central device 110 may be greater than that of the wireless sensor devices 120a-120e. Further, in some embodiments, the central device 110 may not include a sensor 50. Note that communications between the central device 110 and the wireless sensor devices 120a-120e may be performed wirelessly.

Bluetooth supports several types of synchronous unidirectional communications. For example, the Bluetooth specification describes a feature known as periodic advertising. In this mode, a central device transmits an advertisement at regular intervals on a predetermined channel. The transmission of this advertisement occurs at regular intervals. These regular intervals may be multiples of 1.25 milliseconds, between 7.5 milliseconds and 81.91875 seconds. In this way, other network devices are able to enter a low power state and can wake up at predetermined times in order to receive the next periodic advertisement.

Furthermore, the Bluetooth protocol has also added a new feature referred to as Periodic Advertisement with Response (PAwR). With this feature, the central device transmits a periodic advertisement. Additionally, response slots are defined. Thus, remote devices that received the periodic advertisement from the central device are able to provide a response to the central device. Further, higher level protocols define which remote devices can respond and when each is scheduled to respond.

In this figure, central device 110 may transmit a periodic advertisement to the rest of the Bluetooth network 100. This periodic advertisement is received by the wireless sensor devices 120a-120e shown in FIG. 1B. The wireless sensor device may each provide a response to this periodic advertisement.

Figure 2:
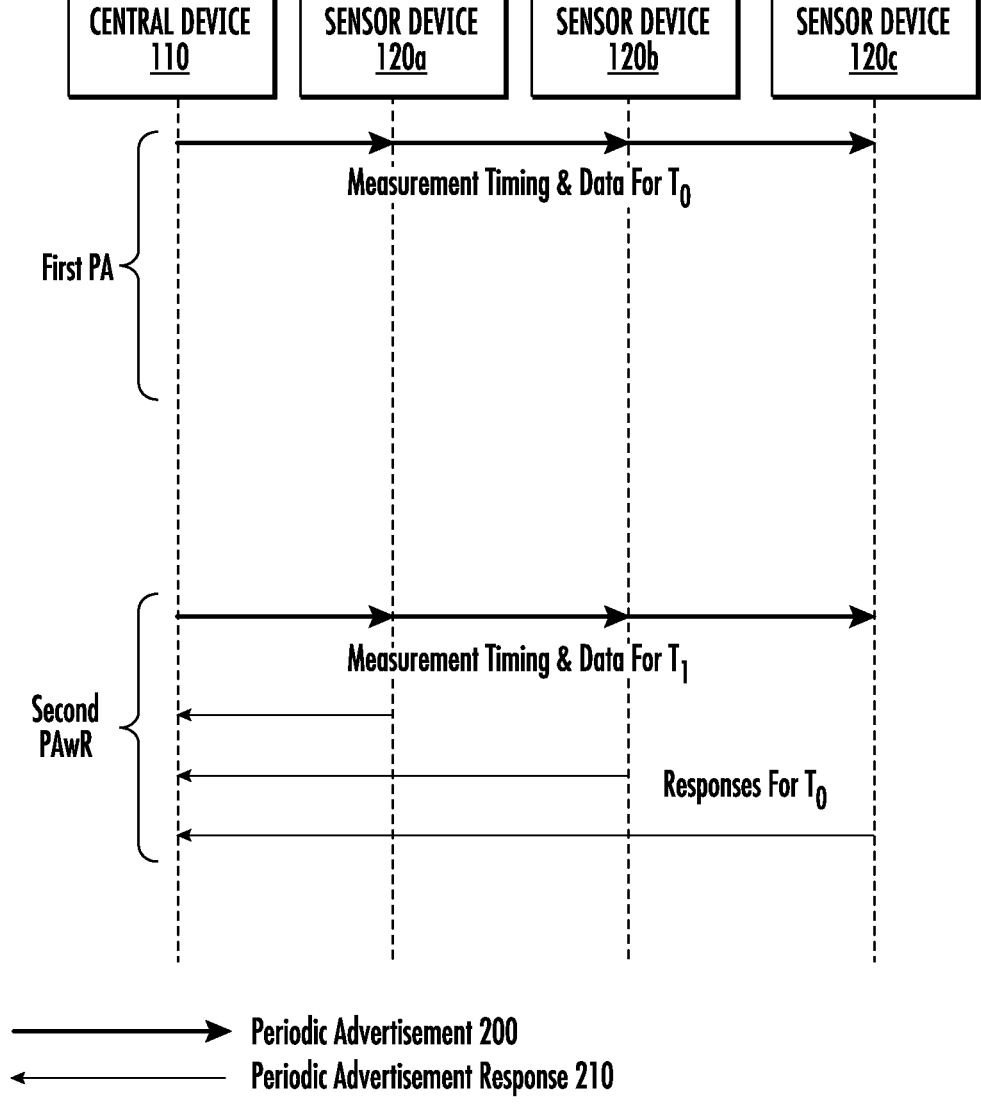
FIG. 2 shows a timing diagram illustrating the method of synchronizing wireless sensor devices.

FIG. 2 shows a timing diagram which illustrates how synchronized measurements may be performed using the Bluetooth network 100. This figure only shows a subset of the wireless sensor devices. Note that the number of wireless sensor devices is not limited by this disclosure.

First, the central device 110 transmits a periodic advertisement 200, which is received by the wireless sensor devices 120a, 120b, 120c. This periodic advertisement may include information regarding a synchronized measurement that is being requested. The information may be referred to as the synchronized measurement information and may include timing information and parameters associated with the synchronized measurement.

To do this, a vendor unique command may be employed which signifies that the central device 110 is requesting a synchronized measurement. Further, this vendor unique command may include a plurality of parameters. One of these parameters may represent the measurement timing. In one embodiment, the time that the measurement is to be taken is provided with respect to the anchor point of the periodic advertisement. In some embodiments, the anchor point is defined as the time at which the periodic advertisement began. In other embodiments, the time that the measurement is to be taken is provided with respect to an event that is common to all wireless sensor devices, such as the start of the periodic advertisement or the end of the periodic advertisement. Other parameters may be provided in the periodic advertisement. Parameters associated with the measurement may be referred to as measurement parameters. For example, in some embodiments, the type of measurement to be performed may be included in the periodic advertisement. For example, the Bluetooth network 100 may have a plurality of wireless sensor devices that perform different functions. By indicating the type of measurement to be performed, only those wireless sensor devices with that capability perform the measurement. In some embodiments, other data associated with the measurement may be provided in the periodic advertisement. For example, configuration data may be provided. In one embodiment, sensors may be used to monitor and report the strength of radio waves, such as by using RSSI (Received Signal Strength Indicator). In this scenario, the measurement parameters in the periodic advertisement may also provide the channel on which the measurement is to be made. Specifically, Bluetooth supports 40 channels, each at a unique frequency. The periodic advertisement may provide the channel number to be measured. Additionally, the measurement may be associated with the signal transmitted by a particular device, which may have a unique access address. Thus, in some embodiments, the measurement parameters may also include the access address of the device transmitting the signal of interest. In some embodiments, the modulation scheme of the packet that the sensor is to measure is also contained in the measurement parameters. Of course, other measurement parameters may also be transmitted in the periodic advertisement.

Thus, the periodic advertisement comprises information related to a synchronized measurement to be performed by the plurality of wireless sensor devices. The synchronized measurement information includes measurement timing and optionally, measurement parameters. Thus, the periodic advertisement provides all of the information needed for the wireless sensor devices to understand what type of measurement is to be performed, what configuration data is associated with the measurement, and the time at which the measurement is to be made.

There may be several control parameters associated with the synchronized measurement information. For example, there may be a control parameter that informs the wireless sensor devices that a measurement is to be performed. There may be a second control parameter that informs the wireless sensor devices to transmit previous measurement results. These parameters may be used in conjunction with one another to form four possibilities:

Perform a measurement;

Perform a measurement and transmit previous measurement data;

Transmit previous measurement data; and

Do nothing.

In another embodiment, rather than using control parameters, different commands may be used to instruct the wireless sensor devices of the operation or operations to perform.

Figure 3:
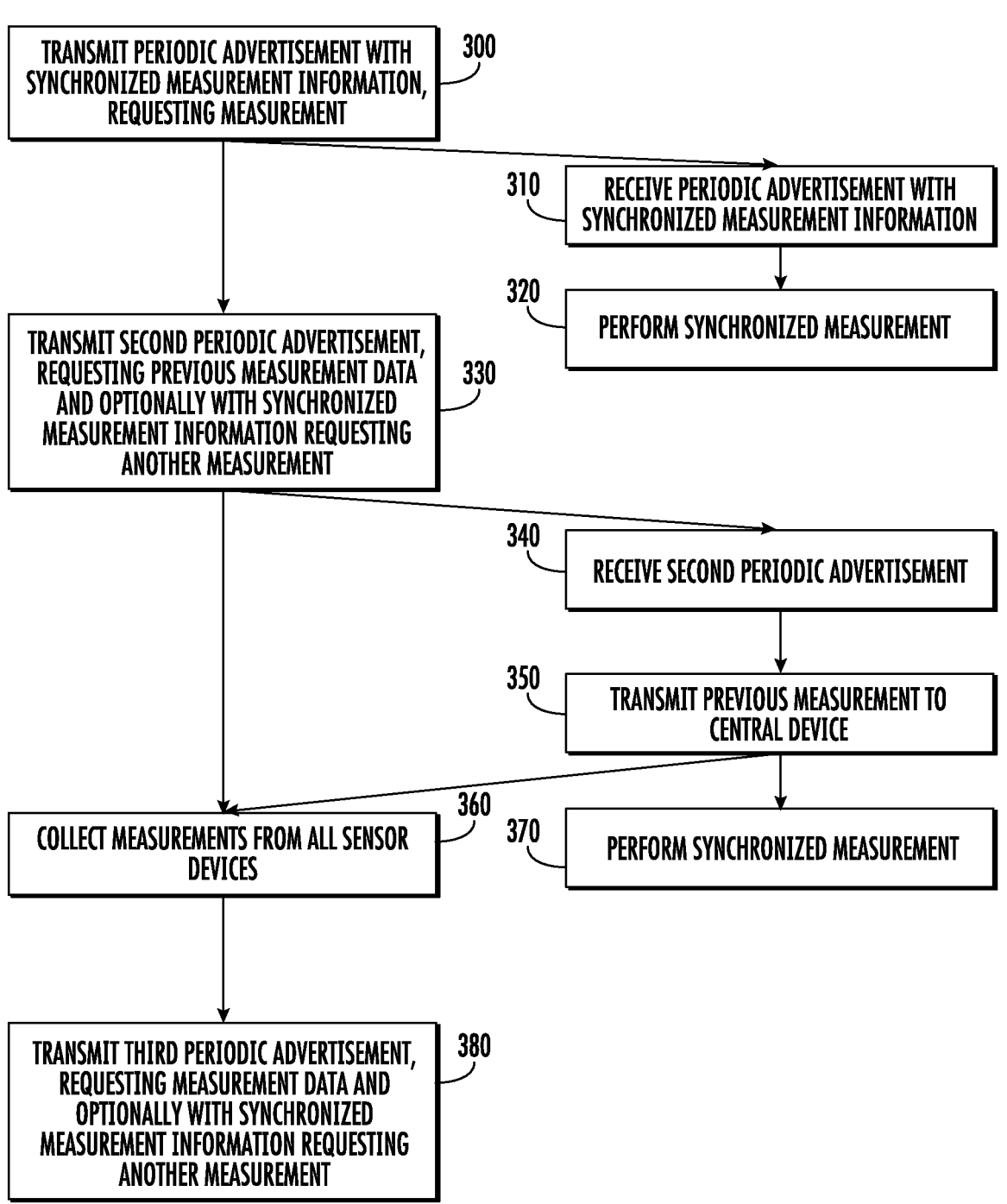
FIG. 3 shows a flowchart that may be executed by the central device and a wireless sensor device in the Bluetooth network.

FIG. 3 is a flow chart showing the operations of the central device 110 and the wireless sensor devices 120a-120e. The operations of the central device 110 are shown on the left, while the operations of the wireless sensor devices 120a-120e are shown on the right. As shown in the top portion of FIG. 2, a periodic advertisement 200 is transmitted by the central device 110. This is also shown in Box 300 of FIG. 3. As described above, the periodic advertisement 200 includes the synchronized measurement information, such as measurement timing and optionally measurement parameters. The synchronized measurement information also informs the wireless sensor devices to perform a measurement. As described above, this may be represented as a control parameter or as a separate command. This periodic advertisement is received by wireless sensor devices 120a, 120b, 120c, as shown in Box 310 of FIG. 3. At a time provided in the periodic advertisement, the wireless sensor devices perform the requested measurement, as shown in Box 320 of FIG. 3. In some embodiments, the time provided in the periodic advertisement may be defined to be a time that is within the current advertisement interval. In other words, the time is earlier than the transmission of the next periodic advertisement.

At a later time, as shown in the lower part of FIG. 2, a second periodic advertisement with responses may be issued by the central device 110. Additionally, the wireless sensor devices 120a-120c may transmit the measurement data that was previously collected back to the central device 110.

FIG. 3 shows this sequence in detail. First, the central device 110 transmits a second periodic advertisement, as shown in Box 330. The time between the first periodic advertisement and the second advertisement may be referred to as the first advertisement interval. In some embodiments, this second periodic advertisement includes a request to transmit the previous measurement data. Additionally, this second periodic advertisement may include a request for another synchronized measurement. This packet is a periodic advertisement with responses. Thus, after transmission of the second periodic advertisement, the wireless sensor devices 120a, 120b, 120c receive the periodic advertisement, as shown in Box 340. In response, the wireless sensor devices 120*a*, 120*b*, 120*c* each transmit a periodic advertisement response 210 to the central device 110, as shown in Box 350. These periodic advertisement responses contain the measurement data for the synchronized measurement that was performed during the first advertisement interval. These responses are received by the central device 110, as shown in Box 360. The central device 110 may then process all of the received measurement data.

If another synchronized measurement is needed, the second periodic advertisement may also include synchronized measurement information, as was described above. In this case, the wireless sensor devices perform another synchronized measurement, as shown in Box 370. Note that FIG. 3 shows the synchronized measurement for the second advertisement interval being performed after the measurement data for the first advertisement interval has been transmitted to the central device 110. However, in other embodiments, the synchronized measurement for the second advertisement interval may be performed before the measurement data from the first advertisement interval has been transmitted. Further, depending on when each wireless sensor device transmits its respective measurement data, it is possible that some wireless sensor devices perform the synchronized measurement for the second advertisement interval before transmitting measurement data from the first advertisement interval, while other wireless sensor devices perform these operations in the opposite order.

The sequence may then continue with the central device 110 transmitting a third periodic advertisement, as shown in Box 380. In some embodiments, the third periodic advertisement may only request that the wireless sensor devices transmit the previous measurement data. In other embodiments, the third periodic advertisement may include synchronized measurement information for a third synchronized measurement.

Figure 4:
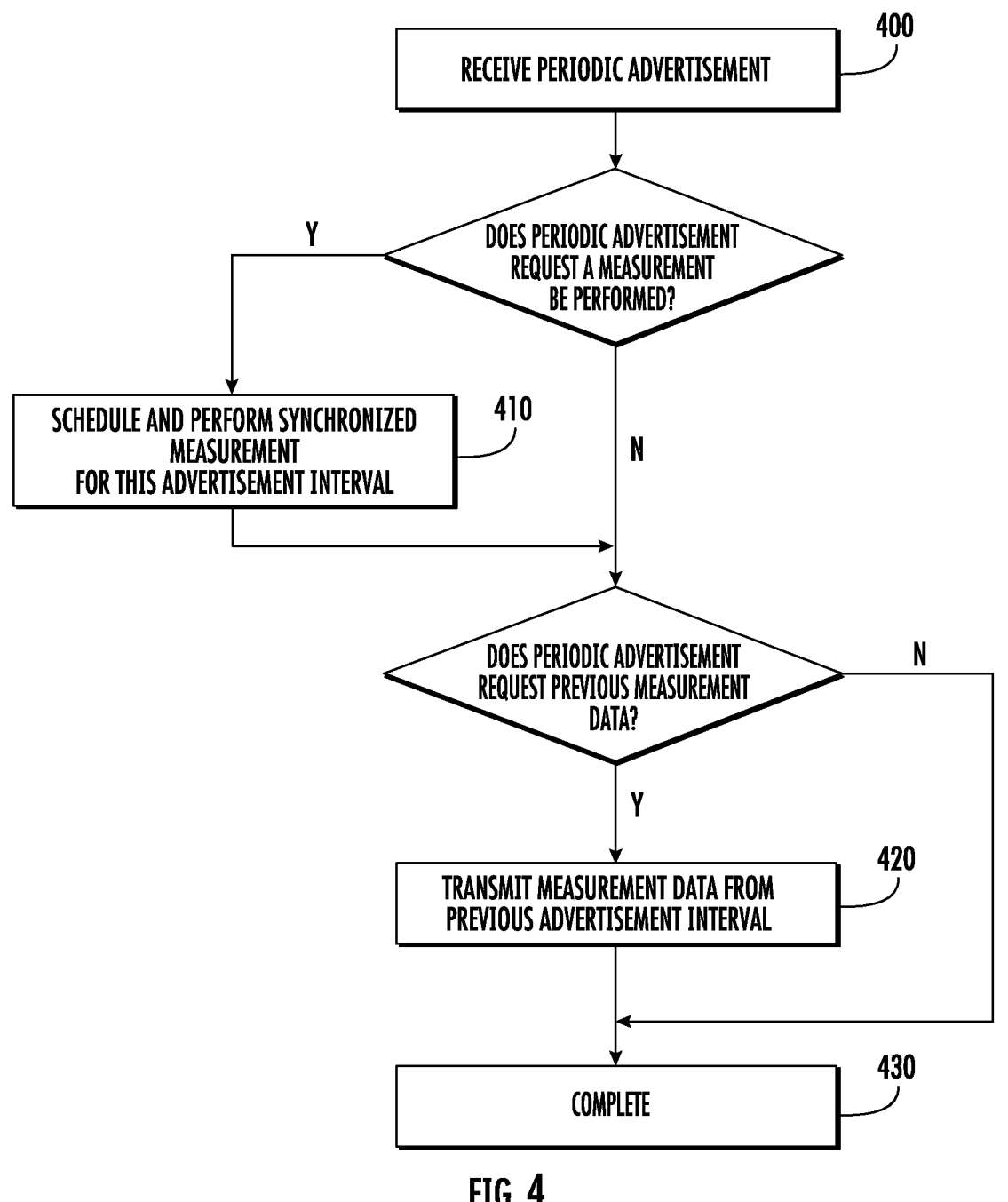
FIG. 4 shows a flowchart that may be executed by the wireless sensor devices.

FIG. 4 shows the operation of the wireless sensor devices. First, as shown in Box 400, a periodic advertisement is received. The wireless sensor device checks to see if this periodic advertisement is requesting a measurement be performed and contains synchronized measurement information. If so, the wireless sensor device schedules and performs the synchronized measurement, as shown in Box 410. The results from the synchronized measurement are referred to as measurement data. If the periodic advertisement does not request a measurement, Box 410 is skipped. The wireless sensor device then checks if this periodic advertisement requests the previous measurement data. If so, the wireless sensor device transmits the measurement data from the previous advertisement interval, as shown in Box 420. If the periodic advertisement does not request any measurement data, Box 420 is skipped. This concludes the sequence used by the wireless sensor device in response to periodic advertisements. Note that the wireless sensor device is adapted to perform a synchronized measurement, transmission of previous measurement data, both operations, or neither operation.

Returning to FIG. 2, it can be seen that, in response to the first periodic advertisement, the wireless sensor device performs the operations shown in Boxes 400 and 410, but does not transmit any measurement data. In response to the second advertisement (which also includes synchronized measurement information), the wireless sensor device performs the operations shown in Boxes 400, 410 and 420. Finally, in response to a later periodic advertisement (which does not include synchronized measurement information), the wireless sensor device performs the operations shown in Boxes 400 and 420.

The present system and method have many advantages. Currently, it is not possible to synchronize measurements across a plurality of wireless sensors. Thus, in many current systems, the sensors are all physically connected to a central node, which communicates via a wired interface, when a measurement is to be taken. This approach is more expensive, requiring additional cabling. Further, in some embodiments, the wireless sensor device may be located in a position where it is not possible to route a cable to that wireless sensor device. By utilizing the present system and method, there is no need for physical wires or cables to connect to the wireless sensor devices, reducing cost and complexity, while maintaining the ability to perform synchronized measurements.

In one specific example, the central device and the wireless sensor devices may be located within an automobile. The central device 110 may issue a periodic advertisement requesting a synchronized measurement, where the measurement is the strength of the signal emitted by the key fob. After a second periodic advertisement, the central device will receive the measurement data from all of the wireless sensor devices. Based on this measurement data, the central device may be able to determine the spatial location of the key fob. Note that this can be performed without any physical connection between the central device and the wireless sensor devices.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of performing a synchronized measurement using a plurality of wireless sensor devices, comprising:

wirelessly transmitting, from a central device, a periodic advertisement, wherein the periodic advertisement requests a measurement and contains synchronized measurement information, wherein the synchronized measurement information includes a time when all measurements are to be made;

receiving, at the plurality of wireless sensor devices, the periodic advertisement;

scheduling, at each of the plurality of wireless sensor devices, the measurement at the time specified by the synchronized measurement information;

performing, at each of the plurality of wireless sensor devices, the measurement to obtain measurement data, wherein the measurements are all performed at the time specified by the synchronized measurement information; and transmitting the measurement data from the plurality of wireless sensor devices to the central device in response to a subsequent periodic advertisement transmitted from the central device, wherein the subsequent periodic advertisement is a periodic advertisement with responses (PAwR) and wherein each of the plurality of wireless sensor devices transmits its measurement data in a respective response slot.

2. The method of claim 1, wherein the synchronized measurement information the comprises the time that measurement is to be performed.

3. The method of claim 1, wherein the synchronized measurement information comprises a type of measurement to be performed.

4. The method of claim 1, wherein the measurement comprises determination of a strength of a signal transmitted on a channel, and the synchronized measurement information contains the channel to be monitored.

5. The method of claim 4, wherein the signal is transmitted by a device having an access address, and the synchronized measurement information contains the access address of the device.

6. The method of claim 5, wherein the synchronized measurement information contains a modulation scheme used by the device having the access address.

7. The method of claim 1, wherein the periodic advertisement is used to instruct the plurality of wireless sensor devices to perform the measurement, transmit previously obtained measurement data, or both.

8. The method of claim 1, wherein the time specified by the synchronized measurement information is before the periodic advertisement with responses is transmitted.

9. A wireless sensor device, comprising:
a Bluetooth network interface;
a sensor;
a processing unit; and
a memory device comprising instructions, which when executed by the processing unit, enable the wireless sensor device to:
   receive a periodic advertisement from a central device, wherein the periodic advertisement requests a measurement and contains synchronized measurement information, wherein the synchronized measurement information includes a time when all measurements are to be made;
schedule a measurement at the time specified in the synchronized measurement information;
perform the measurement at the time using the sensor to obtain measurement data;
receive a second periodic advertisement from the central device, wherein the second periodic advertisement requests the measurement data and is a periodic advertisement with responses (PAWR); and transmit the measurement data to the central device during its respective response slot.

10. The wireless sensor device of claim 9, wherein the time is referenced to an anchor point of an advertisement interval.

11. The wireless sensor device of claim 9, wherein the time is prior to receipt of the second periodic advertisement.

12. The wireless sensor device of claim 9, wherein the second periodic advertisement requests a second measurement and contains synchronized measurement information; and wherein the wireless sensor device performs the second measurement and transmits measurement data from the measurement before a third periodic advertisement is transmitted from the central device.

13. The wireless sensor device of claim 9, wherein the sensor measures a strength of an incoming signal.

14. A wireless sensor system utilizing a Bluetooth protocol, comprising:
a central device; and
a plurality of wireless sensor devices;
wherein the central device transmits a periodic advertisement, wherein the periodic advertisement requests the plurality of wireless sensor devices to perform a measurement and contains synchronized measurement information, wherein the synchronized measurement information includes a time when all measurements are to be made;
wherein the plurality of wireless sensor devices each schedule and perform the measurement at the time specified by the synchronized measurement information to obtain measurement data, such that all of the plurality of wireless sensor devices perform the measurement at the specified time;
wherein the central device transmits a second periodic advertisement, wherein the second periodic advertisement is a periodic advertisement with responses (PAwR); and
wherein, in response to the second periodic advertisement, the plurality of wireless sensor devices each transmit measurement data to the central device during a respective response slot.

15. The wireless sensor system of claim 14, wherein the second periodic advertisement is also used to instruct the plurality of wireless sensor devices to perform a second measurement.

16. The wireless sensor system of claim 14, wherein the time specified is before a transmission of the second periodic advertisement.

17. The wireless sensor system of claim 14, wherein the wireless sensor system is used to determine a spatial location of a key fob using signal strength measurements.

* * * * *